(12) United States Patent
Ford

(10) Patent No.: US 9,751,495 B2
(45) Date of Patent: Sep. 5, 2017

(54) REEL LOCK HAVING MULTIPLE TOOTH DOG

(71) Applicant: Carleton Life Support Systems, Inc., Davenport, IA (US)

(72) Inventor: Brian Ford, Bettendorf, IA (US)

(73) Assignee: Carleton Life Support Systems, Inc., Davenport, IA (US)

( * ) Notice: Subject to any disclaimer, the term of this patent is extended or adjusted under 35 U.S.C. 154(b) by 67 days.

(21) Appl. No.: 14/832,556

(22) Filed: Aug. 21, 2015

(65) Prior Publication Data

US 2017/0050612 A1 Feb. 23, 2017

(51) Int. Cl.
*B60R 22/34* (2006.01)

(52) U.S. Cl.
CPC .......... *B60R 22/34* (2013.01); *B60R 22/3416* (2013.01)

(58) Field of Classification Search
CPC .......... B60R 22/34; B60R 22/38; B60R 22/41
See application file for complete search history.

(56) References Cited

U.S. PATENT DOCUMENTS

| | | | |
|---|---|---|---|
| 4,619,419 A | 10/1986 | Essler | |
| 5,593,105 A | 1/1997 | Schmid et al. | |
| 5,740,979 A | 4/1998 | Rohrle | |
| 5,788,176 A | 8/1998 | Ebner et al. | |
| 6,158,685 A | 12/2000 | Kielwein et al. | |
| 6,871,813 B2 | 3/2005 | Bae | |
| 6,969,023 B2 | 11/2005 | Weller | |
| 8,240,591 B2 | 8/2012 | Aihara et al. | |
| 8,251,304 B2 * | 8/2012 | Boyer | A62B 1/10 242/381.5 |
| 2003/0111571 A1 | 6/2003 | Weller | |
| 2004/0065763 A1 | 4/2004 | Hanna et al. | |
| 2007/0001047 A1 | 1/2007 | Yasuda et al. | |
| 2009/0321550 A1 | 12/2009 | Boyer et al. | |
| 2010/0108796 A1 | 5/2010 | Tonn et al. | |
| 2012/0160948 A1 * | 6/2012 | Demenezes | B65H 75/4428 242/382.4 |
| 2013/0134251 A1 | 5/2013 | Boyer et al. | |

FOREIGN PATENT DOCUMENTS

| | | |
|---|---|---|
| JP | 03-197257 | 8/1991 |
| JP | 2009-214693 | 9/2009 |

* cited by examiner

*Primary Examiner* — Sang Kim
(74) *Attorney, Agent, or Firm* — Woods Oviatt Gilman LLP; Katherine H. McGuire, Esq.

(57) ABSTRACT

Disclosed is an improved reel assembly for use in conjunction with an occupant restraint system. The assembly employs a dual locking arrangement whereby an occupant can be restrained during both major and minor incidents. After a minor incident, the reel assembly can be conveniently unlocked, without the need for accessing the push button, by applying counter tension to the webbing. After a major incident, the reel assembly remains locked until the occupant disengages the reel via a push button. When the reel assembly experiences the force of a major incident, rotation of the webbing shaft may be first partially arrested by the engagement of a first of two locking teeth on a locking dog with a first of two engagement surfaces on a geared end plate and subsequently completely arrested by the combined engagements of the first and second locking teeth with their respective first and second engagement surfaces.

17 Claims, 10 Drawing Sheets

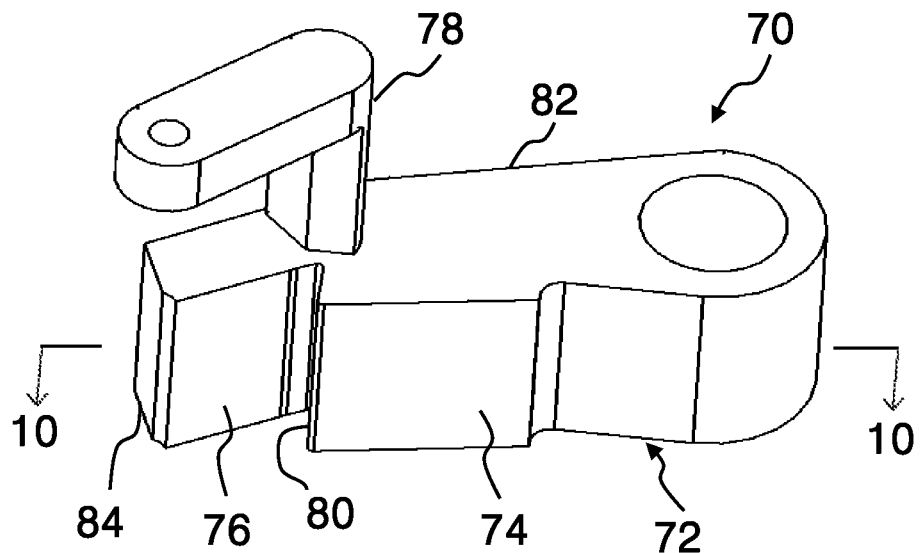
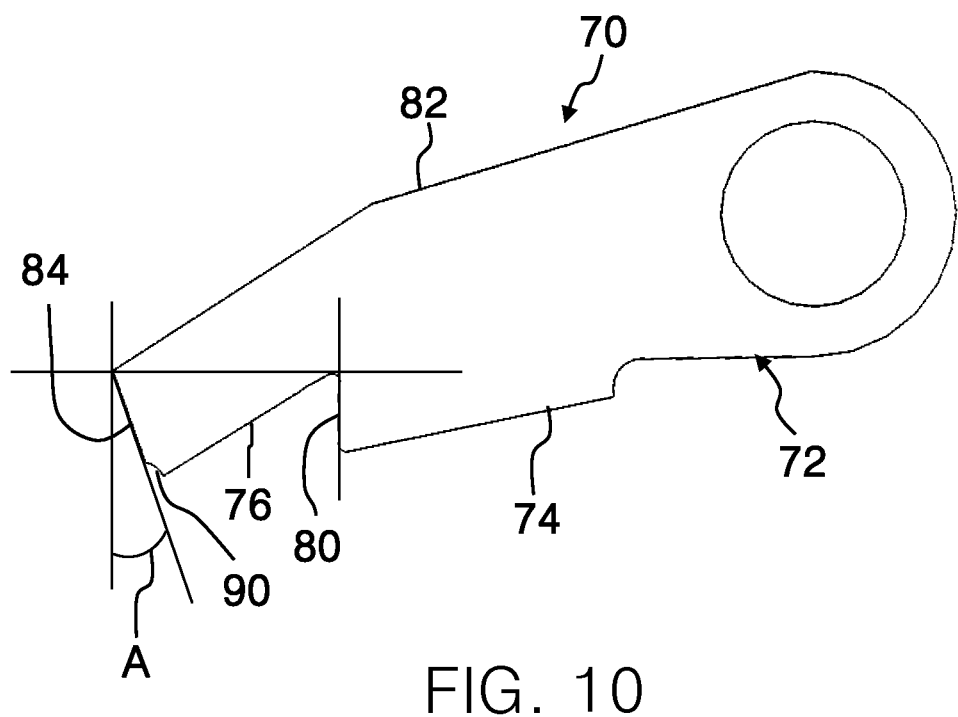

REEL LOCK HAVING MULTIPLE TOOTH DOG

BACKGROUND OF THE INVENTION

1. Field of the Invention

This invention relates to reel lock for use in conjunction with a passenger restraint system. More particularly, the present invention relates to an improved locking dog for use within a reel assembly having dual locking mechanisms, whereby an occupant can be restrained during major events without causing unnecessary "nuisance locking" during non-critical events.

2. Description of the Background Art

The use of harness reels is known in the background art. For instance, U.S. Pat. No. 4,801,105 to Frisk discloses a reel assembly for retracting and locking a shoulder harness. The assembly includes a strap supporting spool affixed to a ratchet wheel. When a strap is rapidly pulled from the reel, an inertia mass turns with respect to the reel. This causes the inertia mass to move forward axially and trip a dog which locks the reel.

Likewise, U.S. Pat. No. 5,636,807 to Warrick discloses an acceleration sensor for an aircraft employing an inertia weight. The inertia weight is movable within a chamber by way of a linkage. The linkage is such that it provides the same output in response to movement of the aircraft in multiple directions.

Although these inventions each achieve their respective objectives, there continues to be a need in the art for a reel assembly with separate locking mechanisms that can be independently triggered and released in response to different events. There is further a need for an improved locking dog that can hold a minimum of 5,000 pound force with 90% of the webbing on the spool for any length webbing supplied with the reel.

SUMMARY OF THE INVENTION

It is, therefore, one of the objects of this invention to provide a reel assembly with separate locking mechanisms.

It is another object of this invention to provide a reel with first and second locking mechanisms, wherein the first mechanism is triggered in response to major incidents and the second mechanism is triggered in response to minor incidents.

It is another object of the present invention to require a user to access a reset button to reset the reel after a major incident.

It is a further object of this invention to permit the reel assembly to be reset after a minor incident via the application of a counter tension to the harness webbing.

It is a further object of this invention to permit the reel assembly to hold a minimum of 5,000 pound force with 90% of the webbing on the spool in accordance with the requirements of MIL-R-8236F.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 9 is a perspective view of a double toothed dog in accordance with a further aspect of the present invention.

FIG. 10 is a cross sectional view of the double toothed dog generally taken along line 10-10 in FIG. 9.

Similar reference characters refer to similar parts throughout the several views of the drawings.

DETAILED DESCRIPTION OF THE PREFERRED EMBODIMENT

The present invention relates to an improved reel assembly for use in conjunction with the occupant restraint system of a vehicle. The assembly employs a dual locking arrangement whereby an occupant can be restrained during both major and minor incidents. After a major incident, such as a collision, the reel assembly remains locked until the occupant disengages the reel by accessing a push button. After a minor incident, such as a fall, the reel assembly can be conveniently unlocked, without the need for accessing the push button, by applying counter tension to the restraint webbing. The details of the present invention are more fully described hereinafter.

Figure 1:
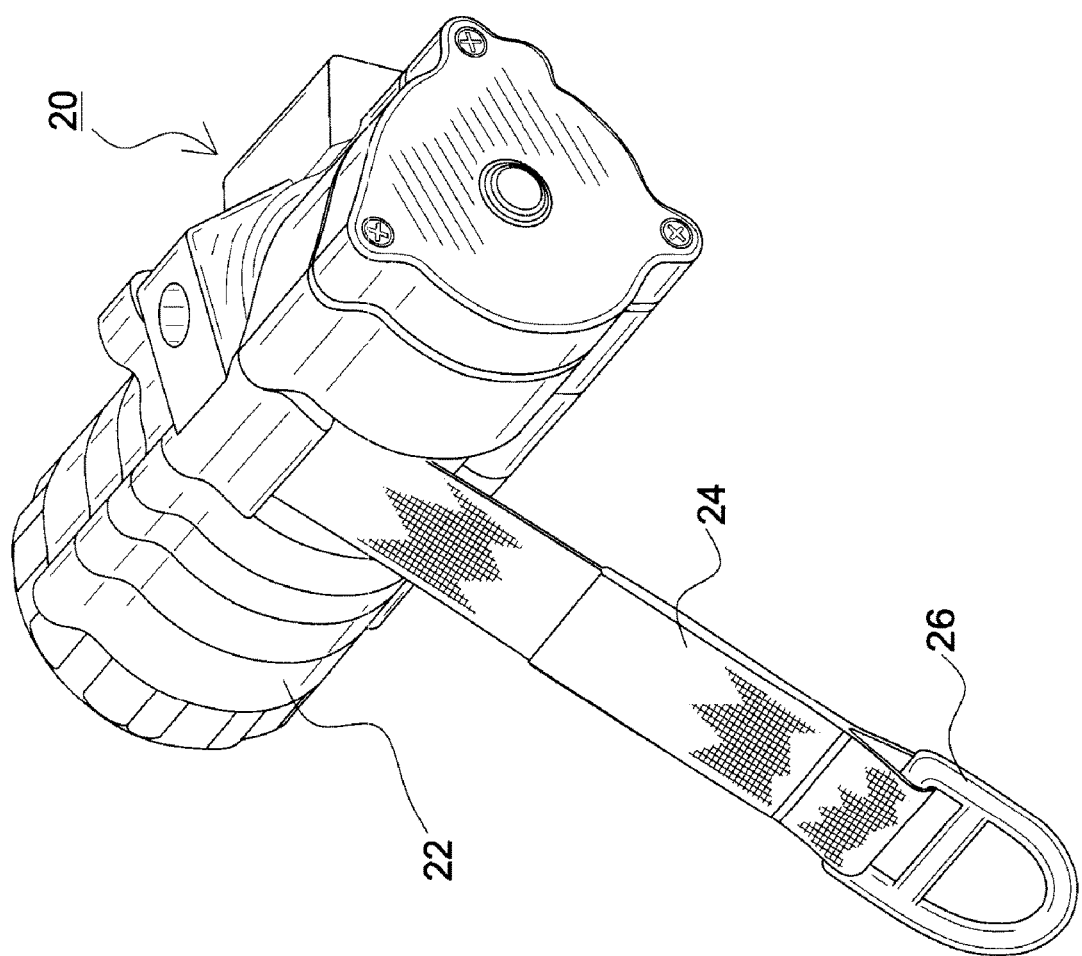
FIG. 1 is a perspective view of the reel assembly of the present invention.

With reference now to FIG. 1, the improved reel assembly of the present invention is illustrated. Reel assembly 20 includes a housing 22 that contains a length of webbing 24 and associated locking and winding mechanisms. These mechanisms control the extraction and refraction of webbing 24 and are more fully described hereinafter. An attachment 26, such as a clip, clasp or carabineer, can be attached to an end of webbing 24 and is used in securing webbing 24 to an occupant restraint, such as a waist belt or body harness.

Reel assembly 20 can be used in connection with any of a wide variety of vehicle restraint systems. For instance, reel assembly 20 can be used in association with the aircrew restraint system disclosed in U.S. Pat. No. 7,275,710 to Van Druff et. al., the contents of which are incorporated herein by reference. In this regard, reel assembly 20 includes one or more mounting apertures for securing the assembly to the inside of an aircrew compartment. The reel can likewise be readily secured within other vehicles, such as automobiles or boats.

When used in connection with a restraint system, reel assembly 20 serves to restrain occupants during both major and minor incidents. A "major incident" is generally defined as an event that results in more than 100 pounds of force being applied to webbing 24. A major incident, for example, may occur when a harnessed aircrew member encounters a rapid change in altitude or excessive G forces. By contrast, a "minor incident" is generally defined as an event that results in less than 100 pounds of force being applied to webbing 24. A minor incident, for example, may occur when a harnessed aircrew member trips or falls within the aircrew compartment. Reel assembly 20 employs two distinct locking mechanisms for minor and major incidents.

Figure 2:
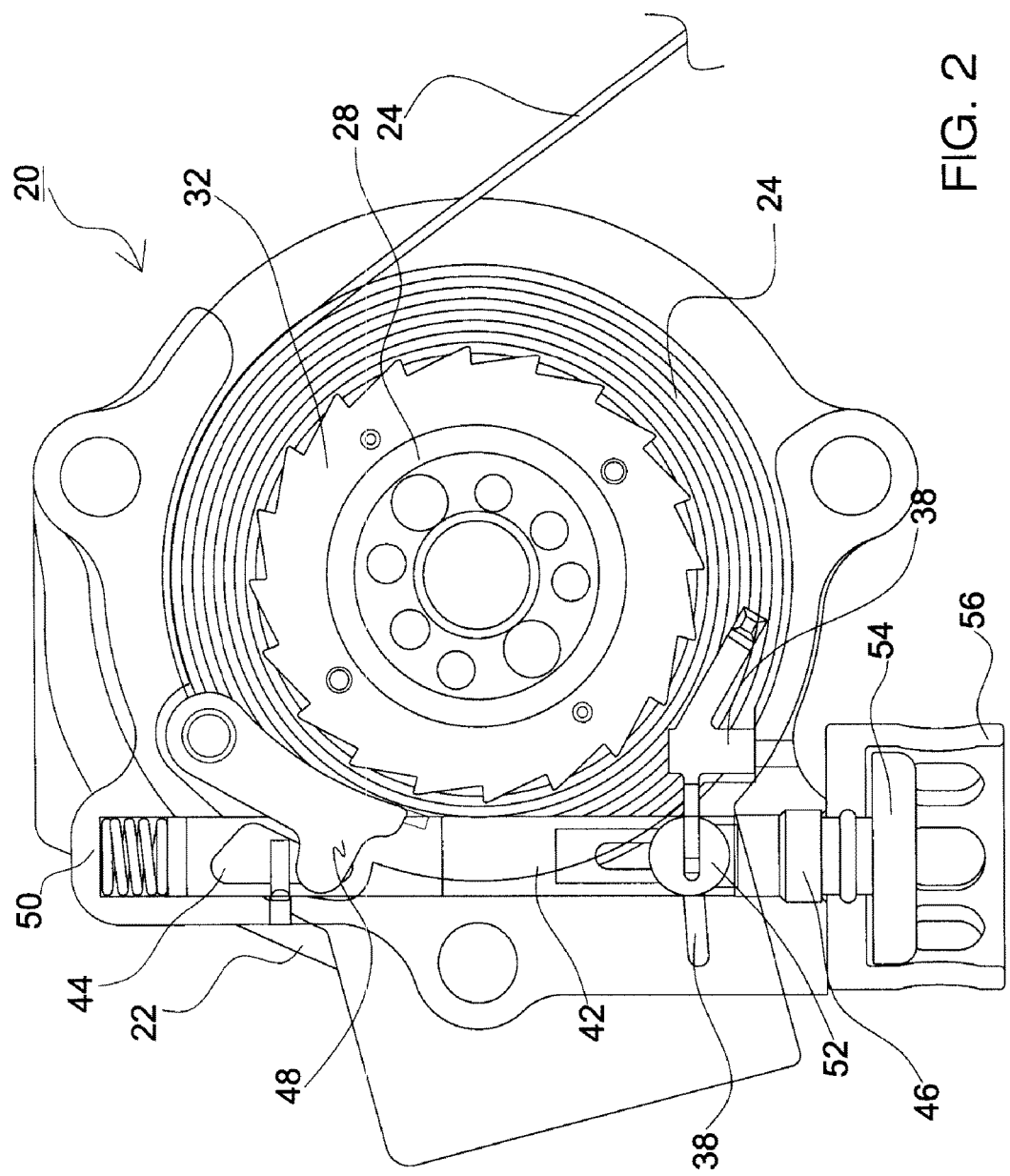
FIG. 2 is a cross sectional view illustrating the first locking mechanism of the reel assembly in the unlocked orientation.
Figure 3:
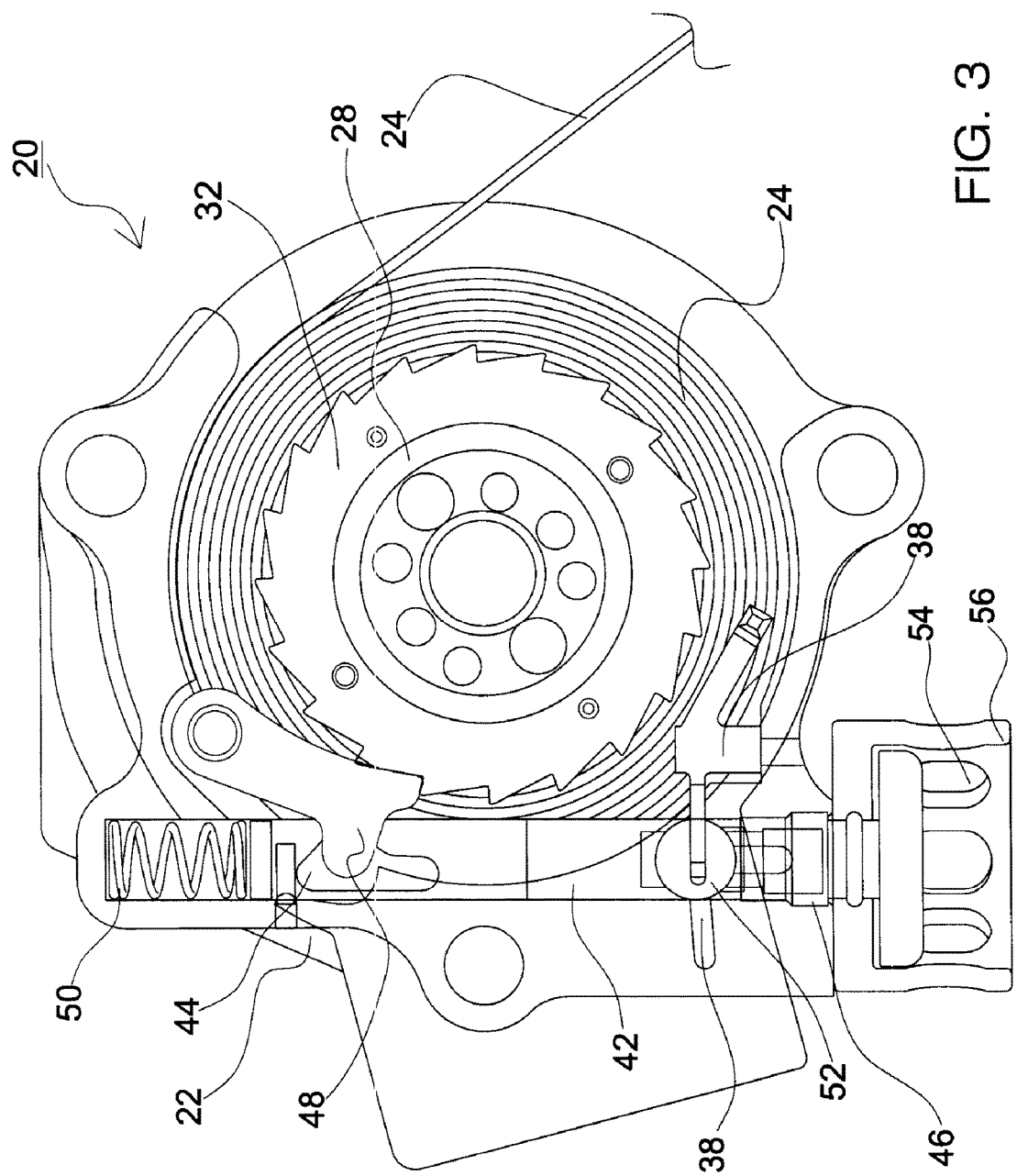
FIG. 3 is a cross sectional view of the first locking mechanism of the reel assembly in the locked orientation.

The first locking mechanism, which is actuated by major incidents, is illustrated in the cross-sectional views of FIGS. 2 and 3. As illustrated, the assembly includes shaft 28 about which webbing 24 can be wound or unwound. Shaft 28 includes a geared end plate 32. As noted in FIGS. 4 and 5, end plate 32 is secured in facing relation with a peripheral locking ring 34. In the absence of a major incident, end plate 32 rotates together with locking ring 34 as webbing 24 is extracted and retracted from shaft 28. However, during a major incident, locking ring 34 is free to rotate independently of shaft 28 and end plate 32. In other words, when forces greater than 100 pounds are applied to webbing 24, locking ring 34 sides along the face of end plate 32. In this regard, ring 34 and end plate 32 can be interconnected via a friction clutch that engages ring 34 and plate 32 during the less forceful extraction of webbing 24. Springs can also be used to provide a suitable interconnection. One such interconnection is described in U.S. Pat. No. 4,955,556 to Frisk, the contents of which are incorporated by reference herein. Whichever of these mechanisms is employed, the rapid withdrawal of webbing 24 causes locking ring 34 to rotate slightly behind the rotation of shaft 28. Ideally, the mechanism is such that the force necessary to cause the independent rotation of ring 34 is adjustable. In this manner, the threshold necessary to trigger a major incident can be adjusted.

Figure 6:
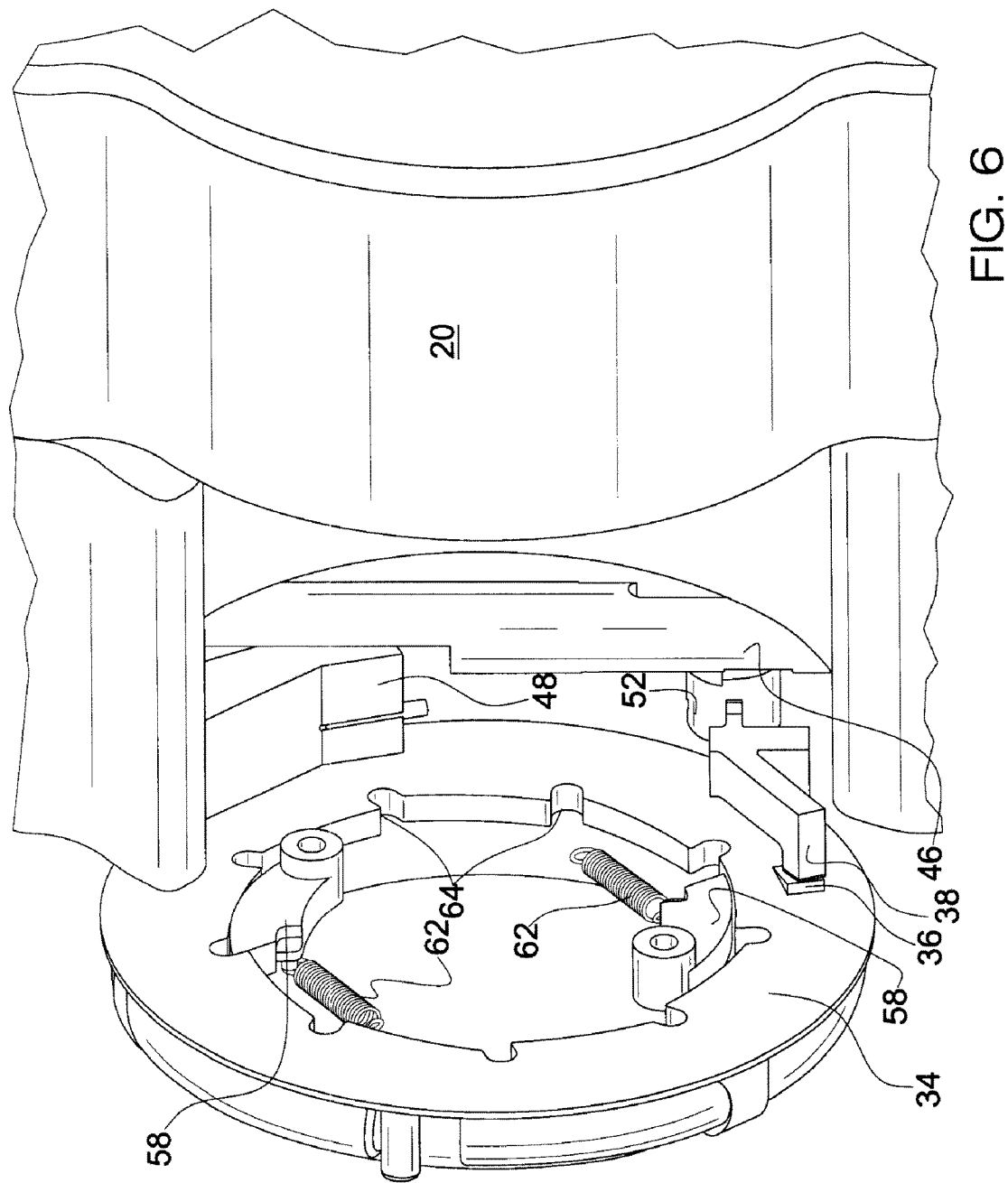
FIG. 6 is a partially exploded view of the reel assembly showing both the first and second locking mechanisms.
Figure 7:
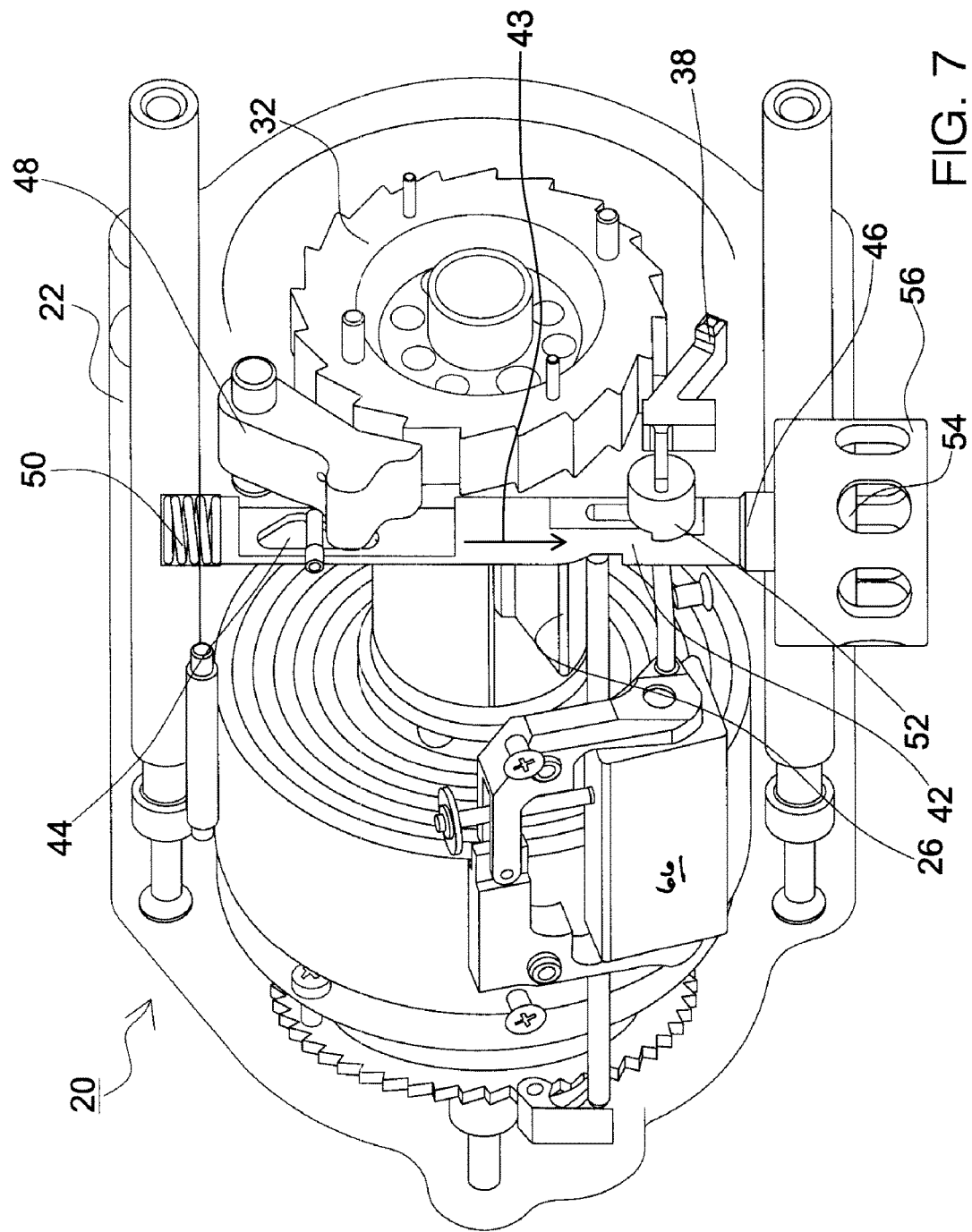
FIG. 7 is a perspective cut away view of the first locking mechanism assembly in the unlocked orientation.
Figure 8:
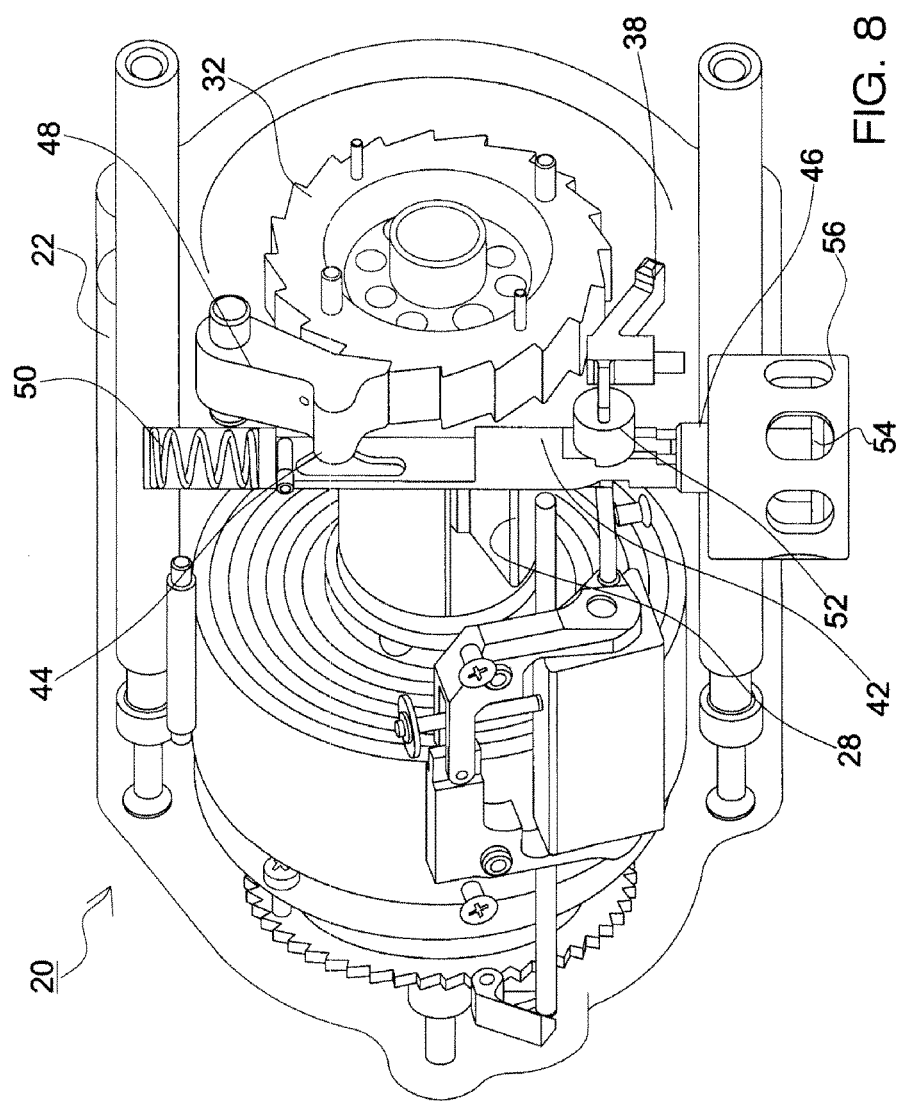
FIG. 8 is a perspective cut away view of the first locking mechanism in the locked orientation.

The first locking mechanism further includes a trigger 38 and an interconnected lock cylinder including a trigger lever 52 that are positioned between ring 34 and shaft 28. Rotation of locking ring 34 relative to shaft 28 causes trigger 38 to engage an inclined ramp 36 on the inside face of ring 34. FIG. 6 illustrates trigger 38 engaging ramp 36 during the relative rotation of ring 34. This, in turn, results in the movement of both trigger 38 and an interconnected trigger lever 52 in a direction parallel to the length of housing 20. Trigger lever 52 is further interconnected to locking bolt 42. The movement of trigger lever 52 permits locking bolt 42 to slide downwardly. As illustrated in FIGS. 7 and 8, bolt 42 includes a cutout 44 and is encased within housing 46.

With continuing reference FIGS. 7 and 8, bolt 42 is biased toward the exterior of the housing 46 by spring 50 in the direction generally indicated by arrow 43. Thus, during a major incident, as trigger 38 engages ramp 40, trigger lever 52 is moved axially with respect to bolt 42. This, in turn, permits bolt to move outwardly within housing 46 under bias of spring 50. The sliding movement of bolt 42 triggers the pivotal movement of primary locking dog 48. More specifically, as bolt 42 slides outwardly, a portion of locking dog 48 encounters the enlarged portion of cutout 44. This, in turn, permits a spring to pivot locking dog 48 such that the distal end of the dog engages the teeth of geared end plate 32.

As further noted in FIGS. 7 and 8, the outward movement of bolt 42 also results in push button 54 being accessible within guard housing 56. Thus, after the occurrence of a major incident, webbing shaft 32 remains locked by way of locking dog 48, thereby prohibiting rotation of shaft 28 and the further extraction of webbing 24. This serves to restrain the movement of an occupant within the associated harness. Webbing shaft 28 remains locked until the occupant accesses and pushes button 54. By depressing button 54, bolt 42 is slid in the direction opposite that shown by arrow 43 thereby disengaging locking dog 48 and trigger 38. As a result, the first locking mechanism is reset and webbing 24 can again be extracted or retracted as noted above.

The second locking mechanism, which is activated by minor incidents, is described next in conjunction with FIGS. 4 and 5. These figures illustrate a series of pawls 58 that are pivotally mounted upon the face of the geared end plate 32. Although connected to plate 32, the distal ends of pawls 58 are adapted to engage recesses 64 that are peripherally located about the inner circumference of locking ring 34. Pawls 58 are maintained in a disengaged state by way of calibration springs 62. These springs 62 are interconnected between the end plate 32 and the distal ends of pawls 58. The force of the springs is such that the pawls 58 are maintained in their disengaged orientation until a predetermined centripetal force is encountered (i.e. upon occurrence of a minor incident). When such a force is encountered, pawls 58 are pivoted outwardly to engage recesses 64. This, in turn, will prevent rotation of shaft 28 and, thus, the further movement of the webbing 24. In this orientation, the occupant is restrained.

After the occurrence of a minor incident, pawls 58 can be reset by simply applying a counter tension to webbing 24. Namely, by pulling back on webbing 24 the distal ends of pawls 58 will be removed from recesses 64 and, thereafter, springs 62 will serve to rotate pawls 58 back into the disengaged orientation. Webbing shaft 32 is then free to rotate and the occupant can move freely within the aircraft.

Alternative Embodiment

A specific implementation of the present invention is next described in conjunction with FIGS. 1-8. As with the primary embodiment, this implementation includes dual locking mechanisms for restraining a vehicle occupant by controlling the displacement of a length of webbing 24 during both major and minor incidents. As is conventional, the webbing 24 includes a webbing clasp 26 at its distal end that can be releasably secured to a harness or other restraint system.

The webbing 24 is wound about a webbing shaft 28 within the interior of the reel assembly 20. As illustrated in FIG. 2, the shaft 28 includes a geared plate 32 at one end. A sufficient length of webbing 24 is included so as to permit the restrained occupant to travel throughout the vehicle. Rotation of the shaft 28 in a first sense results in the displacement of the webbing 24 and creation of sufficient slack so as to permit the free travel of the occupant within the vehicle. Likewise, rotation of the shaft 28 in the opposite sense results in slack being taken up so as to limit the movement of the occupant. As described in greater detail hereinafter, two distinct mechanisms are involved in preventing rotation of shaft 28. These mechanisms effectively restrain the occupant from any movement in the event the occupant falls (minor incident) or vehicle is involved in an accident (major incident).

Figure 4:
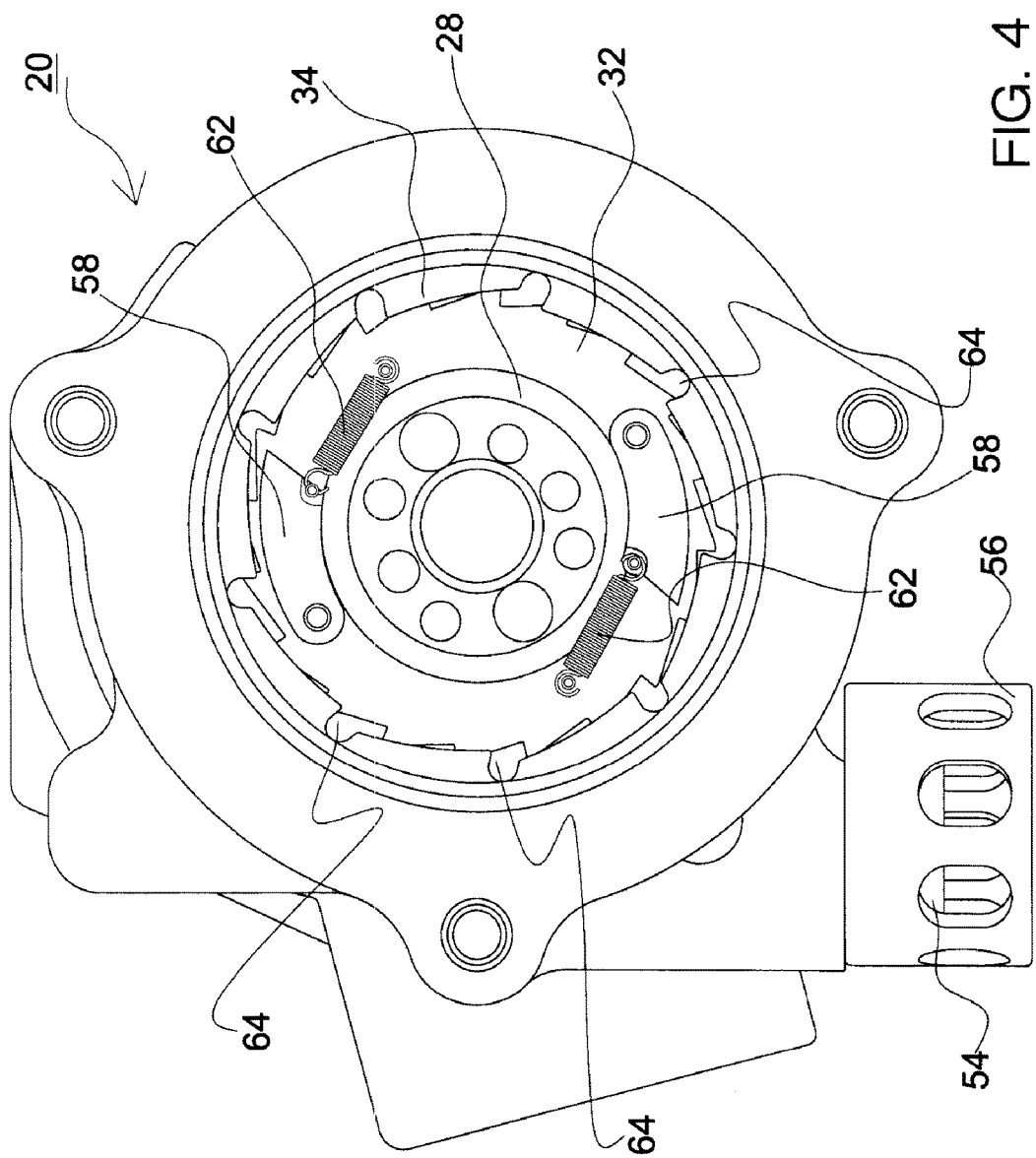
FIG. 4 is a cross sectional view of the second locking mechanism of the reel assembly in the unlocked orientation.
Figure 5:
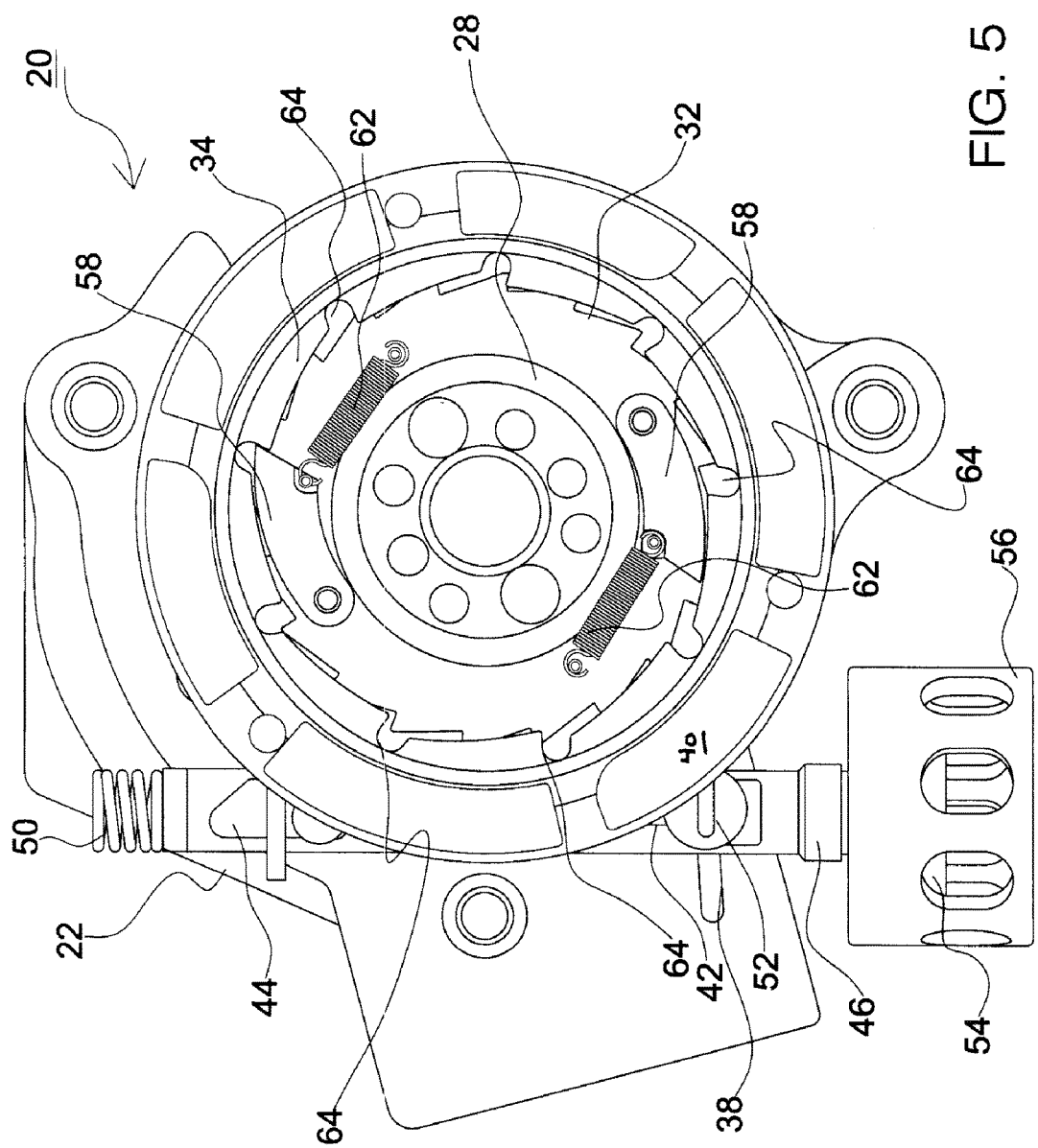
FIG. 5 is a cross sectional view of the second locking mechanism of the reel assembly in the locked orientation.

As illustrated in FIGS. 4 and 5, a pair of locking pawls 58 are pivotally secured to the geared end plate 32. FIG. 4 illustrates the pawls 58 in the unpivoted orientation and FIG. 5 illustrates the pawls 58 in the pivoted orientation. A calibration spring 62 is secured to each locking pawl 58 and serves to bias the pawl 58 into the unpivoted orientation. The bias of these springs can be overcome by centripetal acceleration whenever the webbing shaft 28 is rotated at a predetermined rate. When such forces are encountered, the pawls 58 are forced outwardly to the pivoted orientation whereby at least one of the pawls 58 engages a surrounding locking ring 34 (note FIG. 5).

As illustrated, locking ring 34 includes a geared inner periphery that is adapted to be engaged by one of the pawls 58. The locking ring 34 also includes an outer surface with an associated ramp 36 (note FIG. 6). The function of this ramp is described in greater detail hereinafter. Locking ring 34 is positioned around the geared end plate 32 and is independently rotatable relative thereto. However, the locking ring 34 and the locking pawl 58 rotate together whenever one of the locking pawls 58 is engaged with the geared inner periphery of the locking ring 34. When this occurs, rotation of the webbing shaft 28 causes a corresponding rotation of the locking ring 34. Spring compartments 40 and internal springs are included to resist the rotation of the locking ring 34.

The operation of the locking bolt 42 is described next in association with FIGS. 7 and 8. Locking bolt 42, which includes an elongated cutout 44 along its length, is positioned adjacent the webbing shaft 28. Locking bolt 42 has both an engaged and a disengaged position. A spring 50 is used to bias the locking bolt 42 into the engaged position. With continuing reference to FIGS. 7 and 8, trigger 38 and a trigger lever 52 are operatively coupled to the locking bolt 42 and operate to keep the locking bolt 42 in either its disengaged or its engaged orientation. More specifically, trigger lever 52 engages the lower extent of locking bolt 42 and maintains it in the disengaged position against the bias of the spring 50.

With reference to FIG. 6, it can be seen that trigger 38 is adapted to engage the ramp 36 on the outer surface of the locking ring 34 during the extended rotation of locking ring 34. Namely, trigger 38 engages ramp 36 whenever locking ring 34 is rotated more than 45 degrees. When this occurs, both trigger 38 and trigger lever 52 are pivoted such that trigger lever 52 temporarily disengages the locking bolt 42. This displacement of trigger lever 52 permits spring 50 to force locking bolt 42 into the engaged position. This movement of the locking bolt 42, in turn, permits a locking dog 48 to engage geared end plate 32 so as to prohibit further displacement of webbing 24.

The locking dog 48 is pivotally secured adjacent the geared end plate 32 and has a distal end that rides within the elongated cut out 44 of the locking bolt 42. As noted in FIG. 7, the elongated cut out 44 prevents the locking dog 48 from engaging the geared end plate 32 when the locking bolt 42 is in the disengaged position. However, when the locking bolt 42 is in the engaged position, the geometry of the elongated cut out 44 allows the locking dog 48 to engage the geared end plate 32, as depicted in Figure B. With the locking dog 48 so engaged, the webbing 24 is prevented from being displaced from the webbing shaft 28 and the occupant is effectively restrained.

In operation, rotation of the webbing shaft 28 at a predetermined rate causes the locking pawls 58 to move into the pivoted orientation and engage the locking ring 34. This restricts the displacement of the webbing 24 from the webbing shaft 28 and restrains the occupant. This level of restraint is triggered during minor incidents, such as when the occupant trips or falls. Locking pawls 58 remain engaged within locking ring 34 as long as tension remains in the webbing. The locking pawls 58 can be disengaged by applying a counter tension to the webbing 24 to reset the assembly.

During major incidents, such a vehicle accident, the force on the webbing 24 will cause the locking pawls 58 to engage locking ring 34 and will further cause the locking ring 34 to rotate 45 degrees or more. This rotation, in turn, causes trigger 38 to engage ramp 36, whereby trigger lever 52 will be displaced. As noted in FIG. 8, spring 50 will thereafter be permitted to move the locking bolt 42 into the engaged position such that the locking dog 48 engages the geared end plate 32. With the locking dog 48 fully engaged, further displacement of the webbing 24 is prevented and the occupant is fully restrained. Thus, during major incidents, an occupant is fully restrained. The user can thereafter release the locking dog 48 via a push button at the end of locking bolt 42. In addition to the foregoing, trigger 38 can also be tripped by a separate accelerometer 64. This accelerometer 64 provides a separate and independent means of triggering locking dog 48 and preventing the rotation of webbing shaft 28 during major incidents.

Figure 11:
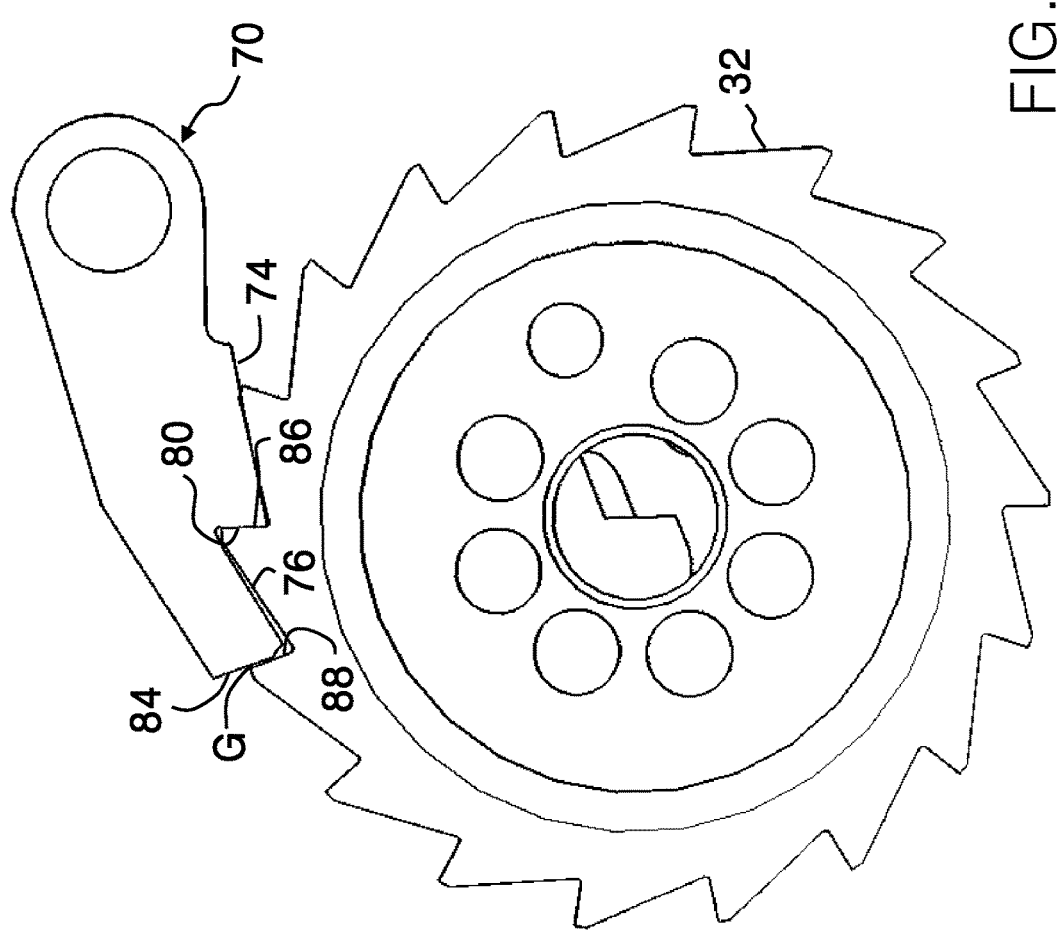
FIG. 11 is a cross sectional isolated view of the double toothed dog shown in FIG. 9 in engagement with a geared end plate in accordance with a further aspect of the present invention.

Turning now to FIGS. 9-11, an improved locking dog 70 is shown. Locking dog 70 is similar to locking dog 48 described above but includes a stepped locking face 72 defining first locking tooth 74 and second locking tooth 76. Locking dog 70 may replace locking dog 48 and may be configured to operate substantially the same as locking dog 48 with the exception of the improved locking performance afforded by stepped locking face 72 as will be discussed in greater detail below. To that end, locking dog 70 may further include an actuating surface, such as elbow portion 78 which may be engaged by the triggering mechanism described above so as to trigger the pivoting locking dog 70 from an unlocked orientation to a locked orientation upon the occurrence of a major incident.

One drawback that has been seen in the prior art is that, upon experiencing a sufficient load (such as may be experienced during a locking event during a major incident), the locking surface on the geared end plate 32 engaged by the locking dog may shear. Thus, to avoid shearing of the geared end plate 32 and subsequent failure of the reel assembly, locking dog 70 may include first and second locking teeth 74, 76 so as to distribute the load across two locking teeth and two locking surfaces on the geared end plate 32. By way of example and not to specifically limited thereto, previous reel assemblies may suffer shearing failures when the geared end plate is subjected to about 4,000 pounds-force (lbf) with 90% WOS (total webbing of 72 inches). It has been found that reel assemblies incorporating locking dog 70 may hold static loads in excess of 5,000 lbf with 90% WOS for an extended periods of time without reel assembly failure.

As discussed above, locking dog 70 may improve the holding strength and minimizes shearing failure by distributing the load across two locking teeth/gear end plate surfaces. The riser portion between the stepped first and second locking teeth 74, 76 creates a first engagement surface 80 while the riser portion between second locking tooth 76 and rear face 82 of locking dog 70 creates a second engagement surface 84. As shown most clearly in FIG. 10, second engagement surface 84 is configured to lie at an angle A with respect to the face of first engagement surface 80. The angled orientation of second engagement surface 84 ensures that the second locking tooth is parallel to the geared end plate so that it presents a flat surface relative to the gear tooth upon engagement. Second locking tooth 76 may further include a notched portion or recess 90. In accordance with an aspect of the present invention, recess 90 may facilitate in spreading the load (i.e. reducing the stresses) places upon second locking tooth 76, and by extension, upon locking dog 70.

As shown in FIG. 11, first locking tooth 74 may be pivoted such that first engagement surface 80 engages first locking surface 86 on geared end plate 32 while second locking tooth 76 is initially spaced slightly from a second locking surface 88 by a gap G. In accordance with one aspect of the present invention, the distance defined by gap G may be between about 0.1 and about 0.001 inches, and more particularly between about 0.01 and about 0.001 inches. Under extreme loads (e.g. loads greater than about 3,000 lbf), first locking surface 86 on geared end plate 32 may begin to deflect. In accordance with an aspect of the invention, the deflection of first locking surface 86 is accomplished by careful selection of the material properties and geometry of the locking dog 70 and geared plate 32 to ensure that the first locking surface 86 will begin to deflect before the first locking tooth 80. As can be appreciated by those skilled in the art, it would also be possible through the selection of materials and geometry to cause the locking tooth 74 to deflect before the geared plate 32. The maximum degree of deflection of first locking surface 86 (or first locking tooth 74) is initially selected through the distance defined by gap G. As the first locking surface 86 (or first locking tooth 74) continues to be deflected under the extreme load, the gap distance is reduced until second locking tooth 76 engages second engagement surface 88. At this point, the load is distributed across first locking tooth 74/first engagement surface 86 and second locking tooth 76/second engagement surface 88. This distribution of the load reduces the potential for shearing of the geared end plate and increases the maximum load which may be held by the reel assembly before reel failure.

It should be understood by those skilled in the art that alternative embodiments of a multiple tooth locking dog may be used depending upon the desired holding force and/or space limitations within the reel assembly. That is, a locking dog possessing three or more locking teeth may be used and such alternative locking dogs are to be considered to be included within the present disclosure. Additionally or alternatively, while the above recitation of the double tooth locking dog discloses a sequence wherein the first locking tooth engages the geared end plate before the second locking tooth, it should be further understood by those skilled in the art that this sequence can be inverted such that the second locking tooth engages the geared end plate before the first locking tooth and that such a sequence should be considered within the present teachings.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A reel assembly for controlling the displacement of webbing comprising:

a webbing shaft with a geared end plate, the webbing being wound about the webbing shaft, with displacement of the webbing being controlled by rotation of the webbing shaft;

at least one locking pawl pivotally secured to the geared end plate, the at least one locking pawl having pivoted and unpivoted orientations, a calibration spring secured to a respective locking pawl, the calibration spring having a bias that functions to urge the respective pawl into the unpivoted orientation, the bias being overcome when the webbing shaft experiences a force having a first magnitude, whereby the respective pawl is moved to the pivoted orientation;

a locking ring having a geared inner periphery, the locking ring positioned around the geared end plate and being independently rotatable thereto, the respective locking pawl engaging the geared inner periphery of the locking ring when the respective pawl is in the pivoted orientation; and a locking dog having first and second locking teeth, each locking tooth configured to selectively lockingly engage a respective first and second engagement surface on the geared end plate to prevent displacement of the webbing, whereby when the webbing shaft experiences the force having the first magnitude, rotation of the webbing shaft is arrested by the engagement of the respective locking pawl with the inner periphery of the locking ring and without engagement of the geared end plate, and whereby when the webbing shaft experiences the force having the second magnitude, rotation of the webbing shaft is first partially arrested by engagement of the first locking tooth of the locking dog with the first engagement surface on the geared end plate and subsequently completely arrested by the combined engagements of the first and second locking teeth with their respective first and second engagement surfaces, wherein the second magnitude is greater than the first magnitude, and wherein a gap is initially defined between the second locking tooth and the second engagement surface when the first locking tooth is engaged with the first engagement surface, wherein the gap is subsequently closed by either:
  a) deflection of the first engagement surface until the second locking tooth engages the second engagement surface, or
  b) deflection of the first locking tooth until the second locking tooth engages the second engagement surface.

2. The reel assembly as described in claim 1 wherein the gap is selected to be between about 0.1 inches and 0.001 inches.

3. The reel assembly as described in claim 1 further comprising:

a locking bolt positioned adjacent the webbing shaft, the locking bolt having engaged and disengaged positions, with the webbing prevented from displacement with the locking bolt in the engaged position.

4. The reel assembly as described in claim 3 further comprising:

a trigger for bringing the locking bolt into the engaged position upon rotation of the locking ring when the webbing shaft experiences a force having a second magnitude.

5. The reel assembly as described in claim 4 further comprising an accelerometer that can engage the trigger upon experiencing the force having the second magnitude.

6. The reel assembly as described in claim 3 further wherein the locking dog is pivotally secured adjacent the geared end plate, the locking dog disengaged from the geared end plate when the locking bolt is in the disengaged position and the locking dog engaged with the geared end plate when the locking bolt is in the engaged position, with the locking dog in engagement with the geared end plate the webbing is prevented from being displaced from the webbing shaft.

7. The reel assembly as described in claim 3 wherein locking bolt includes an elongated cut out and wherein the locking dog includes a distal end that rides within the elongated cut out, whereby the geometry of the elongated cut out forces the locking dog into engagement with the geared end plate when the locking bolt is in the engaged position.

8. The reel assembly as described in claim 1 wherein the second locking tooth is angled relative to the first locking tooth.

9. A reel assembly for controlling the displacement of webbing comprising:
  a webbing shaft with an end plate, the webbing being wound about the webbing shaft;
  a pawl pivotally secured to the end plate, the pawl having locked and unlocked orientations, the pawl being brought to the locked orientation when the webbing shaft experiences a force having a first magnitude;
  a locking ring having an inner periphery, the locking ring positioned around the end plate, whereby when the webbing shaft experiences the force having the first magnitude, rotation of the webbing shaft is arrested by engagement of the pawl with the inner periphery of the locking ring and without engagement of the geared end plate; and
  a locking dog having first and second locking teeth, each locking tooth configured to selectively lockingly engage a respective first and second engagement surface on the end plate to prevent displacement of the webbing upon rotation of the locking ring when the webbing shaft experiences a force having a second magnitude,
  wherein, when the webbing shaft experiences the force having the second magnitude, rotation of the webbing shaft is first partially arrested by the engagement of the first locking tooth of the locking dog with the first engagement surface on the end plate and subsequently completely arrested by the combined engagements of the first and second locking teeth with their respective first and second engagement surfaces,
  wherein in the second magnitude is greater than the first magnitude, and
  wherein a gap is initially defined between the second locking tooth and the second engagement surface when the first locking tooth is engaged with the first engagement surface,
  wherein the gap is subsequently closed by either:
    a) deflection of the first engagement surface until the second locking tooth engages the second engagement surface, or
    b) deflection of the first locking tooth until the second locking tooth engages the second engagement surface.

10. The reel assembly as described in claim 9 wherein both the end plate and the locking ring are geared.

11. The reel assembly as described in claim 10 wherein the end plate and locking ring rotate independently of one another.

12. The reel assembly as described in claim 9 further comprising a calibration spring secured to the pawl, the calibration spring having a bias that functions to urge the pawl into the unlocked orientation, the bias being overcome when the webbing shaft experiences the force having the first magnitude, whereby the pawl is moved to the locked orientation.

13. The reel assembly as described in claim 9 further comprising an accelerometer that is used in triggering the locking dog.

14. The reel assembly as described in claim 9 wherein the gap is selected to be between about 0.1 inches and 0.001 inches.

15. A reel assembly for controlling the displacement of webbing comprising:
  a webbing shaft with an end plate, the webbing being wound about the webbing shaft; and
  a locking dog having first and second locking teeth, each locking tooth configured to selectively lockingly engage a respective first and second engagement surface on the end plate to prevent displacement of the webbing upon rotation of the locking ring when the webbing shaft experiences a force having a predetermined magnitude,
  wherein, when the webbing shaft experiences the force having the predetermined magnitude, rotation of the webbing shaft is first partially arrested by the engagement of the first locking tooth of the locking dog with the first engagement surface on the end plate and subsequently completely arrested by the combined engagements of the first and second locking teeth with their respective first and second engagement surfaces,
  wherein a gap is initially defined between the second locking tooth and the second engagement surface when the first locking tooth is engaged with the first engagement surface,
  wherein the gap is subsequently closed by either:
    a) deflection of the first engagement surface until the second locking tooth engages the second engagement surface, or
    b) deflection of the first locking tooth until the second locking tooth engages the second engagement surface.

16. The reel assembly as described in claim 15 further comprising an accelerometer that is used in triggering the locking dog.

17. The reel assembly as described in claim 15 wherein the gap is selected to be between about 0.1 inches and 0.001 inches.

* * * * *